United States Patent [19]

Tachihara et al.

[11] Patent Number: 5,724,190
[45] Date of Patent: *Mar. 3, 1998

[54] OBJECTIVE LENS FOR ENDOSCOPE

[75] Inventors: Satoru Tachihara; Kazuyuki Takahashi, both of Tokyo, Japan

[73] Assignee: Asahi Kogaku Kogyo Kabushiki Kaisha, Tokyo, Japan

[*] Notice: The term of this patent shall not extend beyond the expiration date of Pat. No. 5,530,591.

[21] Appl. No.: 587,983

[22] Filed: Jan. 17, 1996

Related U.S. Application Data

[63] Continuation of Ser. No. 331,970, Oct. 31, 1994, Pat. No. 5,530,591.

[30] Foreign Application Priority Data

Nov. 1, 1993 [JP] Japan ................................. 5-273902
Sep. 6, 1994 [JP] Japan ................................. 6-212850

[51] Int. Cl.$^6$ ............................. G02B 21/02; G02B 9/00
[52] U.S. Cl. ......................... 359/661; 359/782; 359/783; 359/770; 359/787; 359/788; 359/740
[58] Field of Search ..................... 359/784, 783, 359/770, 761, 661, 740, 782, 787, 788

[56] References Cited

U.S. PATENT DOCUMENTS

| | | | |
|---|---|---|---|
| 4,037,938 | 7/1977 | Yamashita et al. | 359/734 |
| 4,042,295 | 8/1977 | Yamasita et al. | 359/735 |
| 4,059,344 | 11/1977 | Yamasita et al. | 359/783 |
| 4,403,837 | 9/1983 | Nakahashi | 359/770 |
| 4,493,537 | 1/1985 | Nakhashi | 359/783 |
| 4,674,844 | 6/1987 | Nishioka et al. | 359/782 |
| 4,764,001 | 8/1988 | Yokota | 359/740 |
| 4,806,001 | 2/1989 | Okabe et al. | 359/708 |
| 4,867,546 | 9/1989 | Nishioka et al. | 359/714 |
| 4,979,808 | 12/1990 | Yamagata et al. | 359/740 |
| 5,050,974 | 9/1991 | Takasugi et al. | 359/728 |
| 5,087,989 | 2/1992 | Igarashi | 359/692 |
| 5,119,238 | 6/1992 | Igarashi | 359/714 |
| 5,175,650 | 12/1992 | Takayama et al. | 359/716 |
| 5,198,931 | 3/1993 | Igarashi | 359/660 |
| 5,208,702 | 5/1993 | Shiraiwa | 359/663 |
| 5,223,982 | 6/1993 | Suzuki et al. | 359/716 |
| 5,296,971 | 3/1994 | Mori | 359/716 |
| 5,418,649 | 5/1995 | Igarashi | 359/716 |

FOREIGN PATENT DOCUMENTS 63-293515  11/1988  Japan .

*Primary Examiner*—David C. Nelms
*Assistant Examiner*—Evelyn A. Lester
*Attorney, Agent, or Firm*—Greenblum & Bernstein P.L.C.

[57] ABSTRACT

An objective lens for an endoscope includes a first lens group having one negative lens, a second lens group having at least one positive lens, and a third lens group including a positive lens. The objective lens satisfies the following relationship:

$$\theta_{g,d} < -2.223 \times 10^{-3} \cdot v_d + 1.365$$

wherein $\theta_{g,d} = (n_g - n_d)/(n_F - n_C)$, $n_g$ represents the refractive index of the glass material of the first lens group at the g-line, $n_d$ represents the refractive index of the glass material of the first lens group at the d-line, $n_F$ represents the refractive index of the glass material of the first lens group at the F-line, $n_C$ represents the refractive index of the glass material of the first lens group at the C-line, and $v_d$ represents the Abbe number of the glass material of the first lens group.

10 Claims, 11 Drawing Sheets

Fig. 3
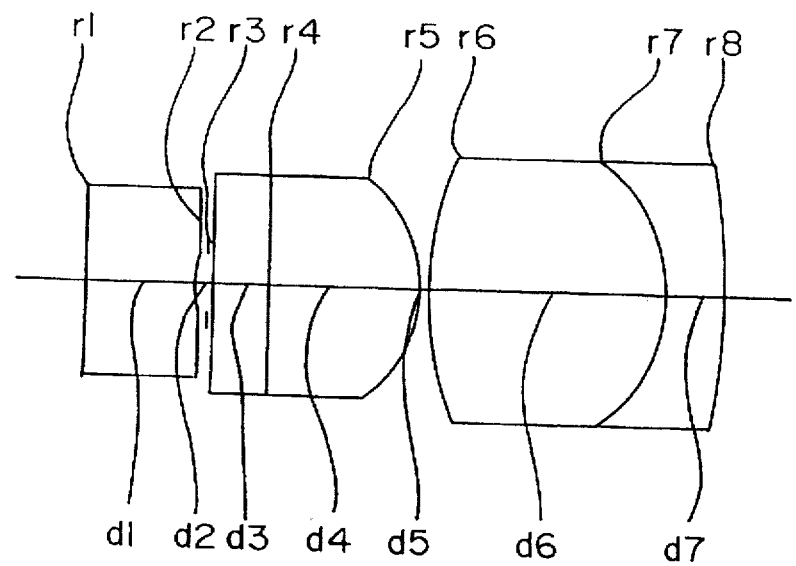
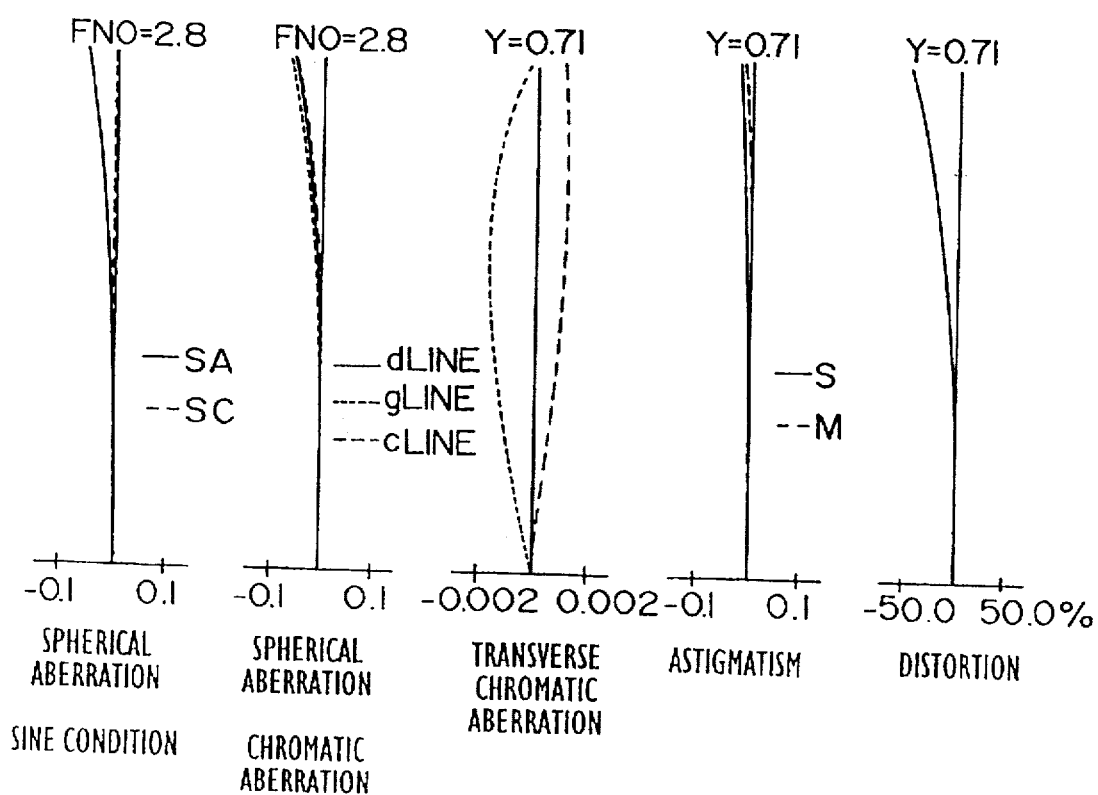

Fig. 7
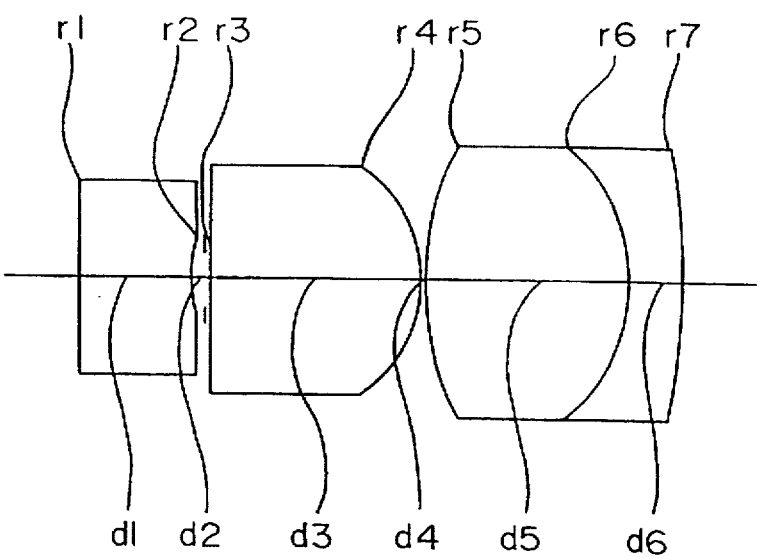
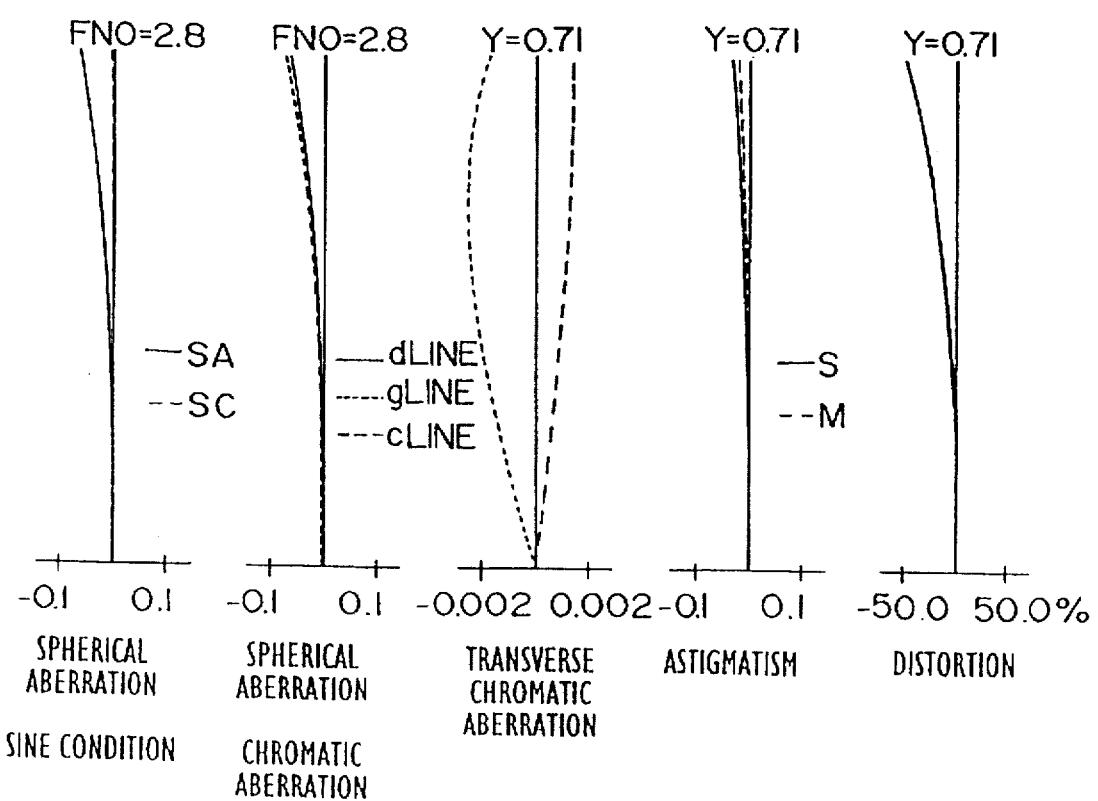

Fig. 17
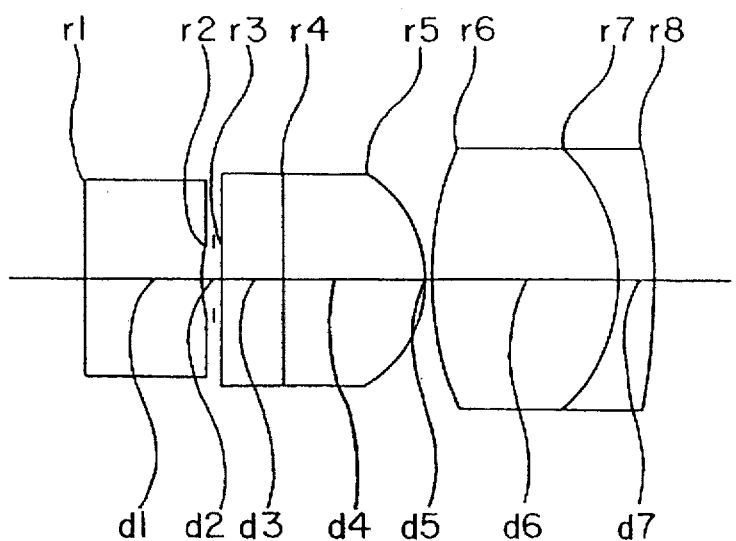
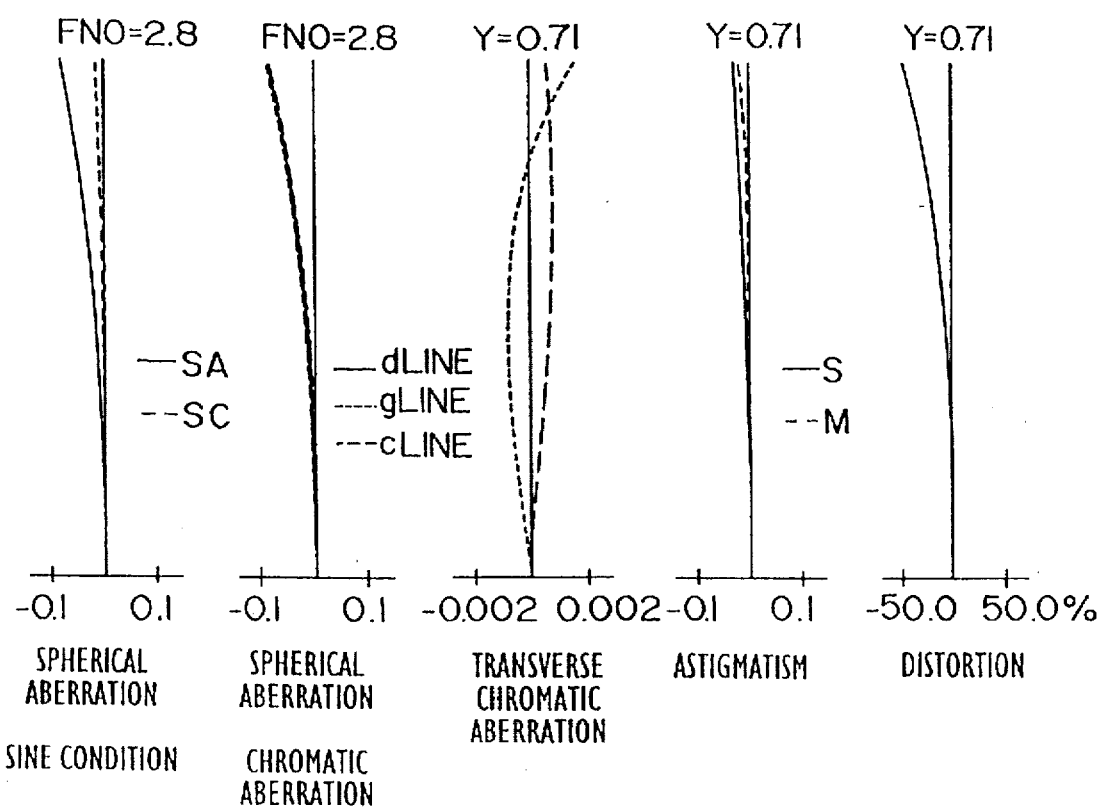

OBJECTIVE LENS FOR ENDOSCOPE

This application is a continuation of application Ser. No. 08/331,970, filed Oct. 31, 1994, now U.S. Pat. No. 5,530,591.

BACKGROUND OF THE INVENTION

1. Field of the Invention

The present invention relates to an objective lens for a medical or industrial endoscope.

2. Description of Related Art

In an objective lens for an endoscope, attempts have been made to eliminate chromatic aberration and particularly, transverse chromatic aberration, which deteriorates an image quality.

For example, the assignee of the present application has proposed a lens arrangement to reduce the transverse chromatic aberration in Japanese Unexamined Patent Publication No. 63-293515. In this proposal, the improvement was directed at the requirements for a Abbe number of the glass material to be used, but there was no specific reference to a relative partial dispersion of the glass material.

SUMMARY OF THE INVENTION

The primary object of the present invention is to provide an objective lens for an endoscope in which the chromatic aberration and particularly, the transverse chromatic aberration, can be eliminated or reduced taking into account the relative partial dispersion of a glass material of which the lens is made.

To achieve the object mentioned above, according to an aspect of the present invention, there is provided an objective lens for an endoscope comprising a first lens group comprised of one negative lens, a second positive lens group comprised of at least one positive lens, and a third positive lens group comprised of one positive lens or a cemented lens including one positive lens and a negative lens adhered thereto, arranged in this order from an object side. The objective lens satisfies the following relationships:

$$\theta_{g,d} < -2.223 \times 10^{-3} \cdot v_d + 1.365 \tag{1}$$

$$-1.2 < f_1/f < -0.8 \tag{2}$$

wherein $$\theta_{g,d} = (n_g - n_d)/(n_F - n_C)$$

$n_g$: refractive index of the glass material of the first lens at the g-line;

$n_d$: refractive index of the glass material of the first lens at the d-line;

$n_F$: refractive index of the glass material of the first lens at the F-line;

$n_C$: refractive index of the glass material of the first lens at the C-line;

$v_d$: Abbe number of the glass material of the first lens;

$f_1$: focal length of the first lens; and $f$: focal length of the whole lens system.

Preferably, the objective lens satisfies the following relationships:

$$v_d < 55 \tag{3}$$

$$n_{n3} - n_{p3} > 0.12 \tag{4}$$

wherein $n_{n\,3}$: refractive index of the negative lens in the third lens group at the d-line; and $n_{p\,3}$: refractive index of the positive lens in the third lens group at the d-line.

Moreover, the objective lens further satisfies the following relationships:

$$-1.2 < R_A/f < -0.6 \tag{5}$$

$$0.05 < d_2/f < 0.3 \tag{6}$$

wherein $R_A$: radius of curvature of the surface of the second lens group that is located closest to an object image; and $d_2$: distance between the first lens group and the second lens group.

The present disclosure relates to subject matter contained in Japanese patent application No. 5-273902 (filed on Nov. 1, 1993) and Japanese patent application No. 6-212850 (filed on Sep. 6, 1994) which are expressly incorporated herein by reference in their entirety.

BRIEF DESCRIPTION OF THE DRAWINGS

The present invention will be described below in detail with reference to the accompanying drawings, in which;

FIG. 3 is a schematic view of a lens arrangement of an objective lens for an endoscope, according to a first embodiment of the present invention;

FIGS. 4A, 4B, 4C, 4D, and 4E show various aberration diagrams of the objective lens shown in FIG. 3;

FIG. 7 is a schematic view of a lens arrangement of an objective lens for an endoscope, according to a third embodiment of the present invention;

FIGS. 8A, 8B, 8C, 8D, and 8E show various aberration diagrams of the objective lens shown in FIG. 7;

FIG. 17 is a schematic view of a lens arrangement of an objective lens for an endoscope, according to an eighth embodiment of the present invention;

FIGS. 18A, 18B, 18C, 18D, and 18E show various aberration diagrams of the objective lens shown in FIG. 17;

DESCRIPTION OF THE PREFERRED EMBODIMENT

Figure 1:
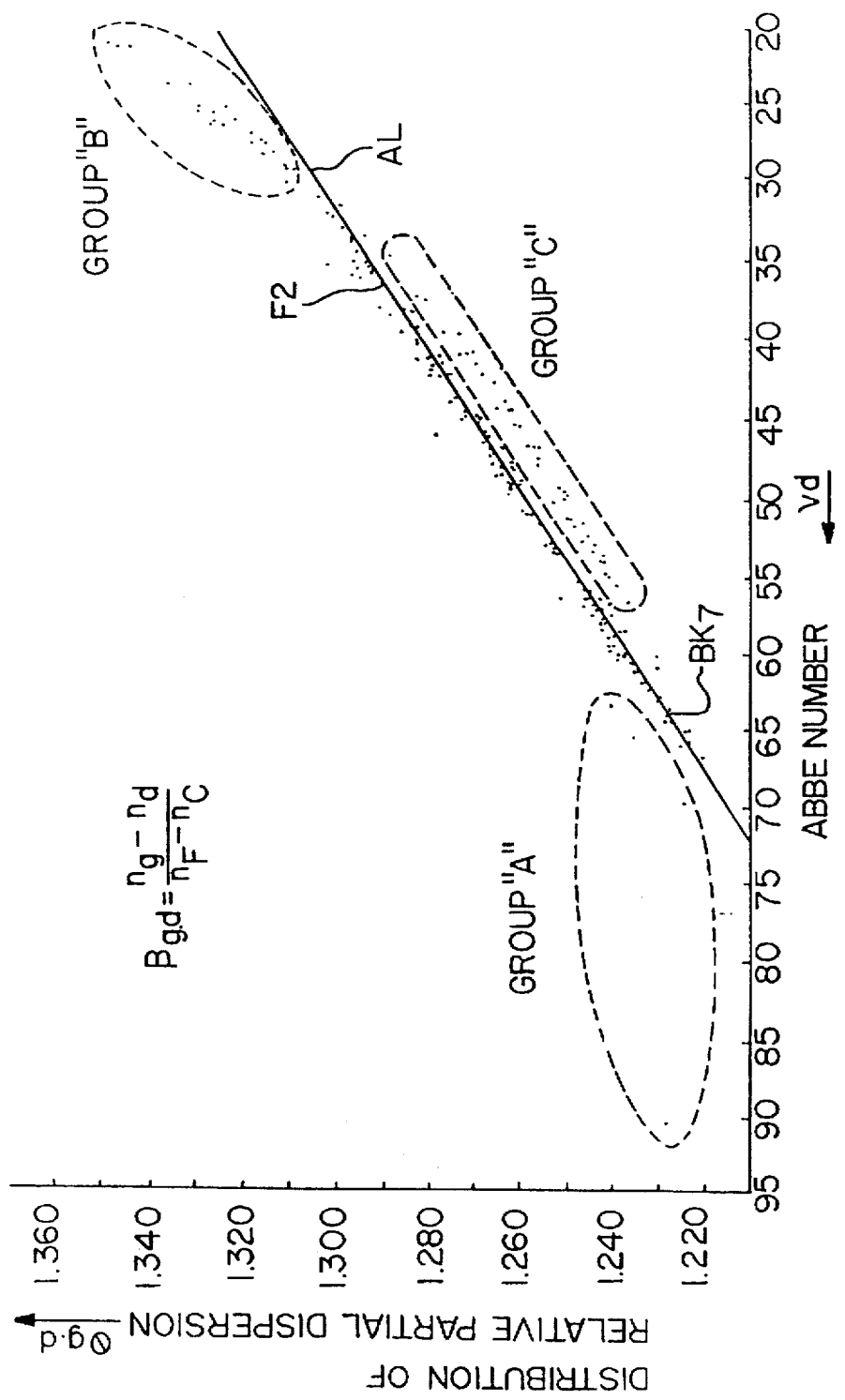
FIG. 1 is a graph showing a distribution of the Abbe number $v_d$ and a distribution of a relative partial dispersion $\theta_{g,d}$ for each glass material.
Figure 2:
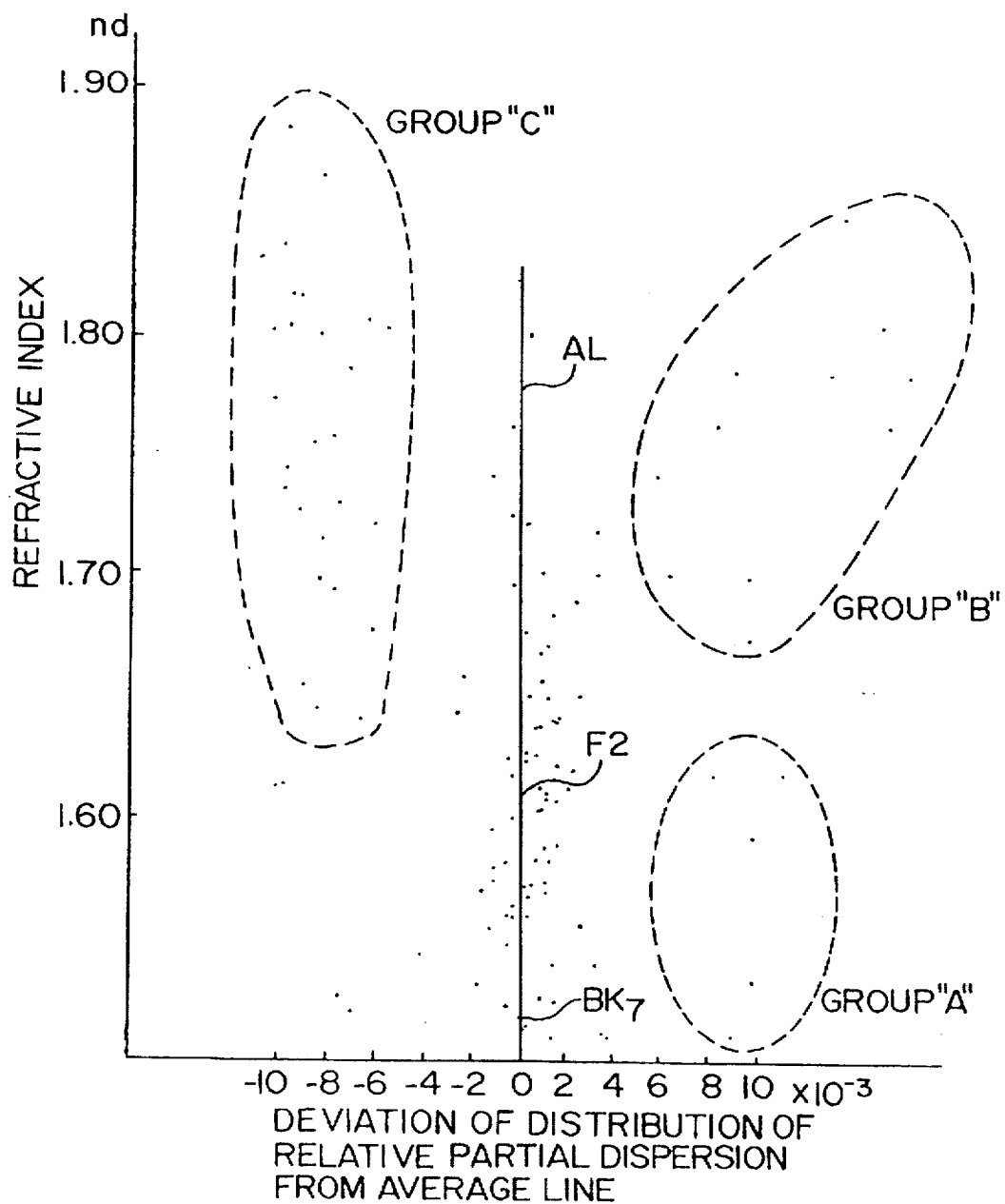
FIG. 2 is a graph showing a distribution of a refractive index n and a deviation of the distribution of relative partial dispersion $\theta_{g,d}$ from an average line at the d-line.

According to the known super achromatic principle, the secondary spectrum (secondary chromatic aberration) can be eliminated or reduced by appropriately selecting the correct relative partial dispersion. FIG. 1 shows a distribution of the Abbe number $v_d$ and a relative partial dispersion $\theta_{g,d}$ for glass materials on the market. FIG. 2 shows a relationship between a refractive index $n_d$ at the d-line and the Abbe number $v_d$ and the relative partial dispersion $\theta_{g,d}$.

To correct for chromatic aberration, it is known to use glass materials having a small Abbe number and a large Abbe number as a negative lens and a positive lens, respectively. To reduce the secondary spectrum, it is necessary to use a glass material in which there is a small difference in the relative partial dispersion. Namely, looking at FIG. 1, it is assumed that the line connecting the points of the typical glass materials BK7 and F2 is an average line AL. From the qualitative viewpoint, a glass material which is represented by plotted points above the average line AL is used for the positive lens, and a glass material which is represented by plotted points below the average line AL is used for the negative lens to reduce the secondary spectrum, respectively.

In the present invention, there are three lens groups consisting of a first negative lens group, a second positive lens group, in order and a third positive lens group to achieve an inexpensive and high quality objective lens for an endoscope. It is necessary to provide at least three lens groups in order to prevent various aberrations. If there are less than three lens groups, it would be impossible to achieve a high quality objective lens having an f-number of about F2.8 and a field angle of about 120°, which can be obtained in the present invention.

In the lens arrangement of the three lens groups (negative, positive, and positive lens groups), it is theoretically possible to make a positive lens of the second lens group or the third lens group of a glass material which is represented by plotted points above the average line AL in FIG. 1, to thereby reduce the secondary spectrum. However, the glass material represented by the points plotted above the average line AL has a large Abbe number and a low refractive index (belonging to a group "A" in FIGS. 1 and 2), or a small Abbe number and a high refractive index (belonging to a group "B" in FIGS. 1 and 2), which are not necessarily appropriate. Namely, the glass material whose refractive index is low causes the radius of curvature of each lens to decrease, thus resulting in an increase in aberrations, such as spherical aberration or field curvature, etc., or it is difficult to produce such a lens. In addition, for glass material whose refractive index is low, it is very difficult to compensate for the spherical abberation.

Similarly, it is theoretically possible to make a negative lens of the first lens group or a negative lens within the second or third lens group of a glass material which is represented by the points plotted below the average line AL in FIG. 1, to thereby reduce the secondary spectrum. The glass material represented by the points plotted below the average line AL has an intermediate Abbe number and a high refractive index (belonging to a group "C" in FIGS. 1 and 2). However, it is preferable that the negative lens within the second or third lens group is made of a glass material having a small Abbe number to correct the chromatic aberration, and accordingly, the glass materials belonging to group "C" are not recommendable.

In view of the analysis mentioned above, the best option is to use a glass material whose relative partial dispersion $\theta_{g,d}$ is below the average line AL and whose Abbe number is as small as possible, for the first lens group.

As mentioned above, however, the refractive index of the glass material below the average line AL is high. For instance, known glass materials LASF08, LASF09, LASK01, or KZFS40, etc., that are used in the embodiments of the present invention are below the average line AL and have a high refractive index. Consequently, if the first lens is made of a glass material below the average line AL, not only can the secondary spectrum be effectively reduced, but also the radius of curvature can be increased, thus resulting in a reduction of the spherical aberration. Moreover, the first lens can be easily produced. However, the Petzval sum and the field of curvature are both increased.

The basic concept of the present invention is to solve the problem with an increase in the Petzval sum which is caused by the use of a glass material below the average line AL as the first lens. The inventors of the present application have found that the problem is solved by increasing the negative power of the first lens, so that the increased Petzval sum can be adjusted by a large negative Petzval value caused by the second surface of the first lens.

Formula (1) specifies the relative partial dispersion $\theta_{g,d}$ of the glass material of which the first lens is to be made. If the value of $\theta_{g,d}$ is larger than the upper limit, the secondary spectrum cannot be effectively reduced, and accordingly, a large chromatic aberration occurs.

Formula (2) specifies the power of the first lens group in connection with formula (1). If the value of formula (2) is smaller than the lower limit, the power of the first lens group is too small to reduce the Petzval sum, so that the curvature of the field increases. Conversely, if the value of formula (2) is larger than the upper limit, the power is so strong that there is a large spherical aberration and coma, thus resulting in a deteriorated contrast of an object image.

Preferably, the objective lens satisfies formulae (3) and (4) to enhance the optical performance thereof. Formula (3) specifies the Abbe number of the glass material of which the first lens group is to be made. If the Abbe number is below the upper limit, the chromatic aberration as well as other aberrations can be effectively and easily corrected.

Formula (4) specifies the refractive indexes of the positive lens and the negative lens belonging to the third lens group. If the value of formula (4) is above the lower limit, the transverse chromatic aberration can be considerably reduced, while restricting the spherical aberration, axial chromatic aberration, coma and astigmatism within an acceptable range.

If the objective lens satisfies formulae (5) and (6), the abberation off-axis and on-axis has been corrected to an acceptable level, so that a uniform and acceptable optical performance can be obtained over the whole image plane.

Formula (5) specifies the radius of curvature of the surface of the second lens group that is located closest to an object image. If the surface satisfies the requirement defined in formula (5), an over-correction of the spherical aberration, chromatic aberration, and negative Petzval value caused in the first lens group can be appropriately cancelled, so that the axial performance and off-axis performance can be well balanced and kept uniform.

To keep a better balance of the axial performance and off-axis performance, it is preferable that the objective lens satisfies the following relationship (5');

$$-1.0 < R_A/f < -0.8. \quad (5')$$

Formula (6) specifies the distance between the first and second lens groups to keep the balance of the aberration therebetween in connection with formula (5). In the present invention, the first lens group has a relatively strong power to reduce the Petzval sum, as mentioned above. Consequently, over-correction of aberrations, and particularly, over-correction of spherical aberration and chromatic aberration occurs in the first lens group. Such over-correction of aberrations can be cancelled by the under-correction of aberration caused by the second lens group having a positive power. To ensure a reliable cancellation, the distance between the first and second lens groups must be within the limits defined by formula (6). If the distance is out of these limits, no appropriate cancellation is effected, so that the spherical aberration and chromatic aberration remain, and hence the image quality is deteriorated. Furthermore, the lower limit in formula (6) is necessary to obtain a physical distance between the first and second lens groups.

First Embodiment:

FIG. 3 shows a lens arrangement of an objective lens, according to a first embodiment of the present invention.

The second lens group is comprised of a cemented lens consisting of a plane-parallel plate and a positive lens. The third lens group is comprised of a cemented lens consisting of a positive lens and a negative lens.

Numerical data of the objective lens shown in FIG. 3 is shown in Table 1 below. Diagrams of various aberrations thereof are shown in FIGS. 4A, 4B, 4C, 4D and 4E.

In FIGS. 4A, 4B, 4C, 4D, and 4E, "SA" represents the spherical aberration, "SC" the sine condition, "d-line", "g-line" and "C-line" the chromatic aberration represented by the spherical aberration and the transverse chromatic aberration, at the respective wavelengths, "S" the sagittal ray, and "M" the meridional ray, respectively.

In the tables and the drawings, "$F_{NO}$" represents the f-number, "f" the focal length, "$\omega$" the half angle of view, "$f_B$" the back-focal distance, "$r_i$" the radius of curvature of each lens surface, "$d_i$" the lens thickness or the distance between the lenses, "$N_d$" the refractive index of the d-line, and "$v_d$" the Abbe number of the d-line, respectively.

TABLE 1

$F_{NO}$ = 1:2.89
f = 0.82
M = −0.080
$\omega$ = 59.6°
$f_B$ = 0.66

| surface $N_O$ | $r_i$ | $d_i$ | $N_d$ | $v_d$ |
|---|---|---|---|---|
| 1 | ∞ | 0.60 | 1.88300 | 40.8 |
| 2 | 0.779 | 0.05 | — | — |
| STOP | ∞ | 0.03 | — | — |
| 3 | ∞ | 0.30 | 1.84666 | 23.8 |
| 4 | ∞ | 0.76 | 1.72916 | 54.7 |

TABLE 1-continued $F_{NO}$ = 1:2.89
f = 0.82
M = −0.080
$\omega$ = 59.6°
$f_B$ = 0.66

| surface $N_O$ | $r_i$ | $d_i$ | $N_d$ | $v_d$ |
|---|---|---|---|---|
| 5 | −0.776 | 0.03 | — | — |
| 6 | 1.979 | 1.26 | 1.77250 | 49.6 |
| 7 | −0.889 | 0.30 | 1.92286 | 21.3 |
| 8 | −4.572 | — | — | — |

In the first embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656

Figure 5:
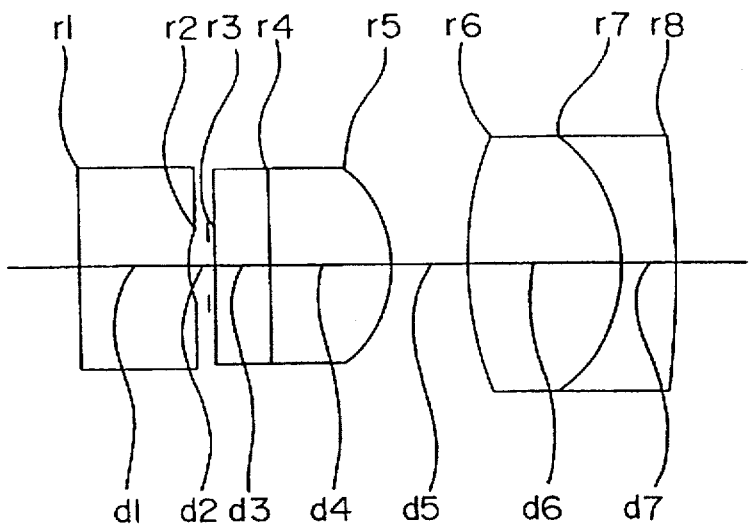
FIG. 5 is a schematic view of a lens arrangement of an objective lens for an endoscope, according to the second embodiment of the present invention.
Figures 6A, 6B, 6C, 6D, 6E:
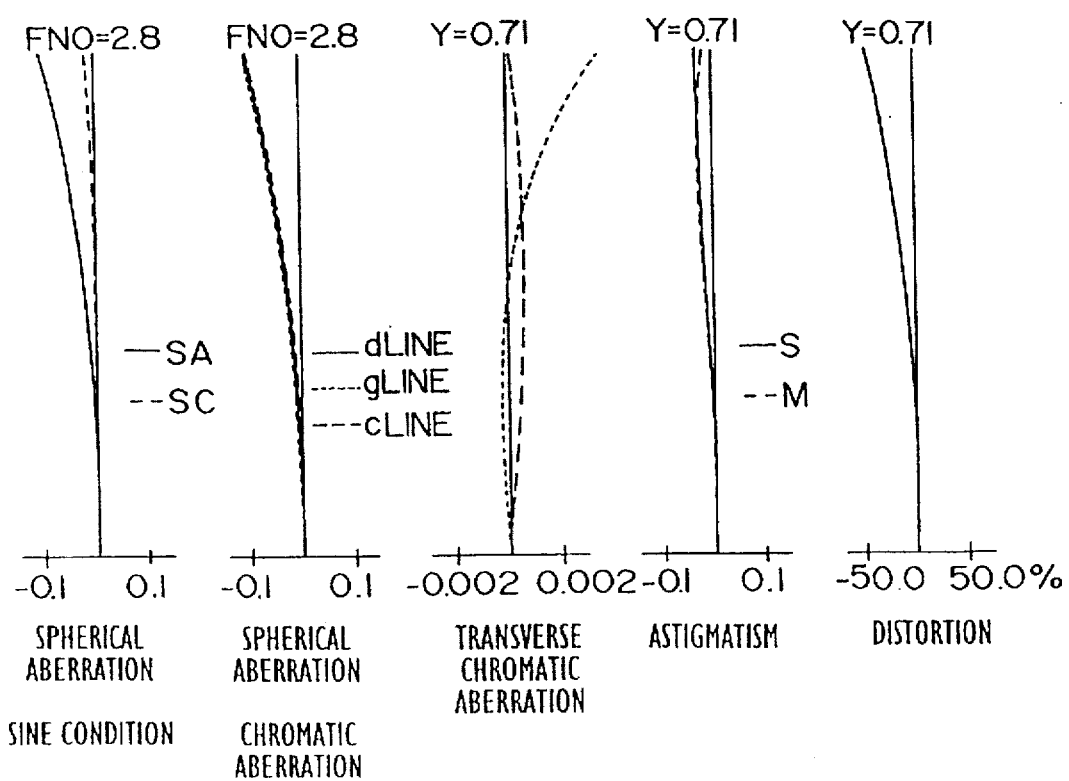
FIGS. 6A, 6B, 6C, 6D, and 6E show various aberration diagrams of the objective lens shown in FIG. 5.

Second Embodiment:

FIG. 5 shows a lens arrangement of an objective lens, according to a second embodiment of the present invention.

The second lens group is comprised of a cemented lens consisting of a plane-parallel plate and a positive lens. The third lens group is comprised of a cemented lens consisting of a positive lens and a negative lens.

Numerical data of the lens system shown in FIG. 5 is shown in Table 2 below. Diagrams of various aberrations thereof are shown in FIGS. 6A, 6B, 6C, 6D, and 6E.

TABLE 2

$F_{NO}$ = 1:2.66
f = 0.82
M = −0.080
$\omega$ = 59.7°
$f_B$ = 0.75

| surface $N_O$ | $r_i$ | $d_i$ | $N_d$ | $v_d$ |
|---|---|---|---|---|
| 1 | ∞ | 0.60 | 1.88300 | 40.8 |
| 2 | 0.677 | 0.11 | — | — |
| STOP | ∞ | 0.03 | — | — |
| 3 | ∞ | 0.30 | 1.84666 | 23.8 |
| 4 | ∞ | 0.64 | 1.72916 | 54.7 |
| 5 | −0.710 | 0.42 | — | — |
| 6 | 1.878 | 0.84 | 1.77250 | 49.6 |
| 7 | −0.895 | 0.30 | 1.92286 | 21.3 |
| 8 | −7.439 | — | — | — |

In the second embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656.

Third Embodiment:

FIG. 7 shows a lens arrangement of an objective lens, according to a third embodiment of the present invention.

The second lens group is comprised of a single positive lens. The third lens group is comprised of a cemented lens consisting of a positive lens and a negative lens.

Numerical data of the lens system shown in FIG. 7 is shown in Table 3 below. Diagrams of various aberrations thereof are shown in FIGS. 8A, 8B, 8C, 8D, and 8E.

TABLE 3

$F_{NO} = 1:2.89$
$f = 0.83$
$M = -0.081$
$\omega = 59.6°$
$f_B = 0.81$

| surface $N_O$ | $r_i$ | $d_i$ | $N_d$ | $\nu_d$ |
|---|---|---|---|---|
| 1 | ∞ | 0.60 | 1.88300 | 40.8 |
| 2 | 0.749 | 0.07 | — | — |
| STOP | ∞ | 0.03 | — | — |
| 3 | ∞ | 1.08 | 1.72916 | 54.7 |
| 4 | −0.791 | 0.05 | — | — |
| 5 | 1.785 | 1.07 | 1.69100 | 54.8 |
| 6 | −0.938 | 0.30 | 1.92286 | 21.3 |
| 7 | −3.591 | — | — | — |

In the third embodiment, the refractive indexes $N_g$, $N_F$, and $N_C$ of the first lens at the g-line, F-line and C-line are as follows:

$N_g$: 1.91049
$N_F$: 1.89822
$N_C$: 1.87656.

Figure 9:
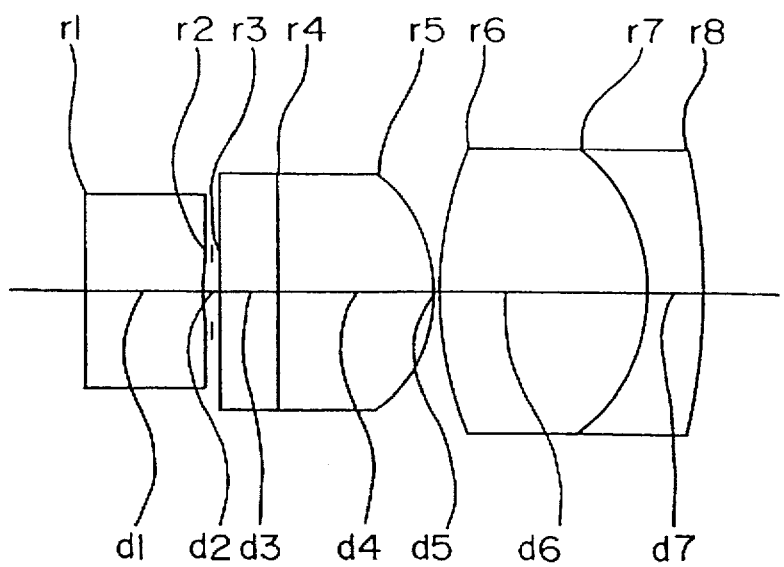
FIG. 9 is a schematic view of a lens arrangement of an objective lens for an endoscope, according to a fourth embodiment of the present invention.
Figures 10A, 10B, 10C, 10D, 10E:
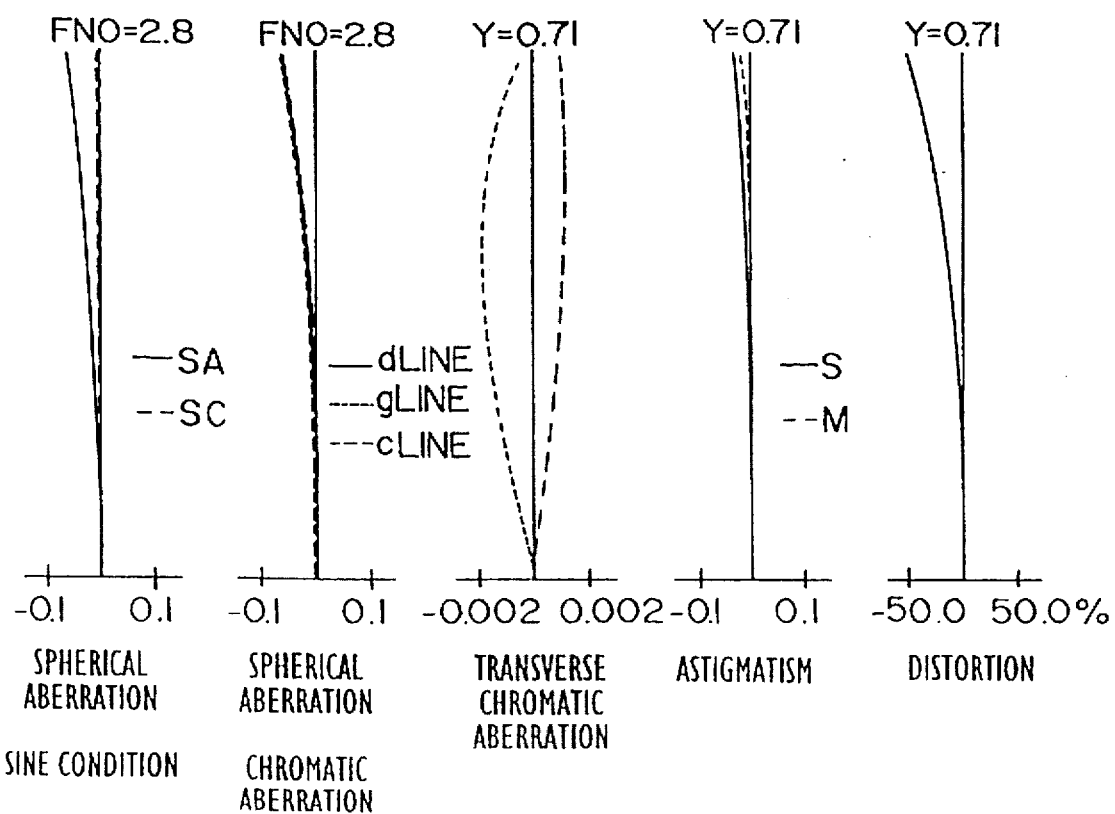
FIGS. 10A, 10B, 10C, 10D, and 10E show various aberration diagrams of the objective lens shown in FIG. 9.

Fourth Embodiment:

FIG. 9 shows a lens arrangement of an objective lens, according to a fourth embodiment of the present invention.

The second lens group is comprised of a cemented lens consisting of a plane-parallel plate and a positive lens. The third lens group is comprised of a cemented lens consisting of a positive lens and a negative lens.

Numerical data of the lens system shown in FIG. 9 is shown in Table 4 below. Diagrams of various aberrations thereof are shown in FIGS. 10A, 10B, 10C, 10D, and 10E.

TABLE 4

$F_{NO} = 1:2.81$
$f = 0.83$
$M = -0.080$
$\omega = 60.2°$
$f_B = 0.79$

| surface $N_O$ | $r_i$ | $d_i$ | $N_d$ | $\nu_d$ |
|---|---|---|---|---|
| 1 | ∞ | 0.60 | 1.88300 | 40.8 |
| 2 | 0.823 | 0.05 | — | — |
| STOP | ∞ | 0.03 | — | — |
| 3 | ∞ | 0.30 | 1.84666 | 23.8 |
| 4 | ∞ | 0.80 | 1.72916 | 54.7 |
| 5 | −0.806 | 0.03 | — | — |
| 6 | 2.089 | 1.08 | 1.77250 | 49.6 |
| 7 | −0.950 | 0.30 | 1.92286 | 21.3 |
| 8 | −3.909 | — | — | — |

In the fourth embodiment, the refractive indexes $N_g$, $N_F$, and $N_C$ of the first lens at the g-line, F-line and C-line are as follows:

$N_g$: 1.91049
$N_F$: 1.89822
$N_C$: 1.87656.

Figure 11:
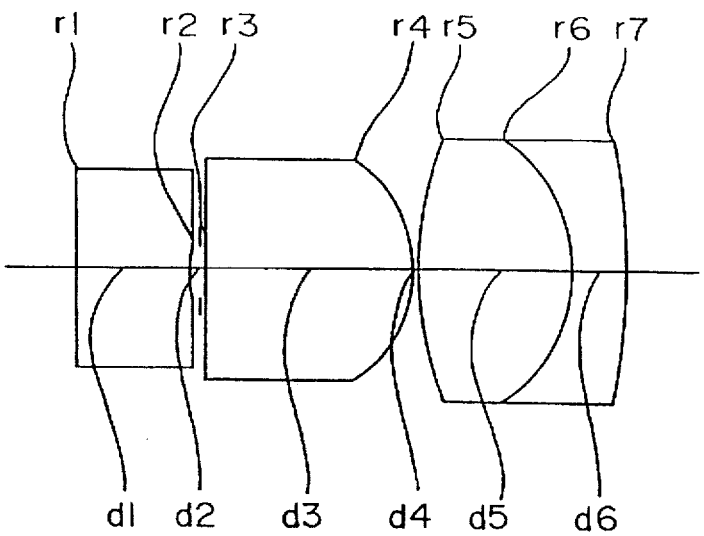
FIG. 11 is a schematic view of a lens arrangement of an objective lens for an endoscope, according to a fifth embodiment of the present invention.
Figures 12A, 12B, 12C, 12D, 12E:
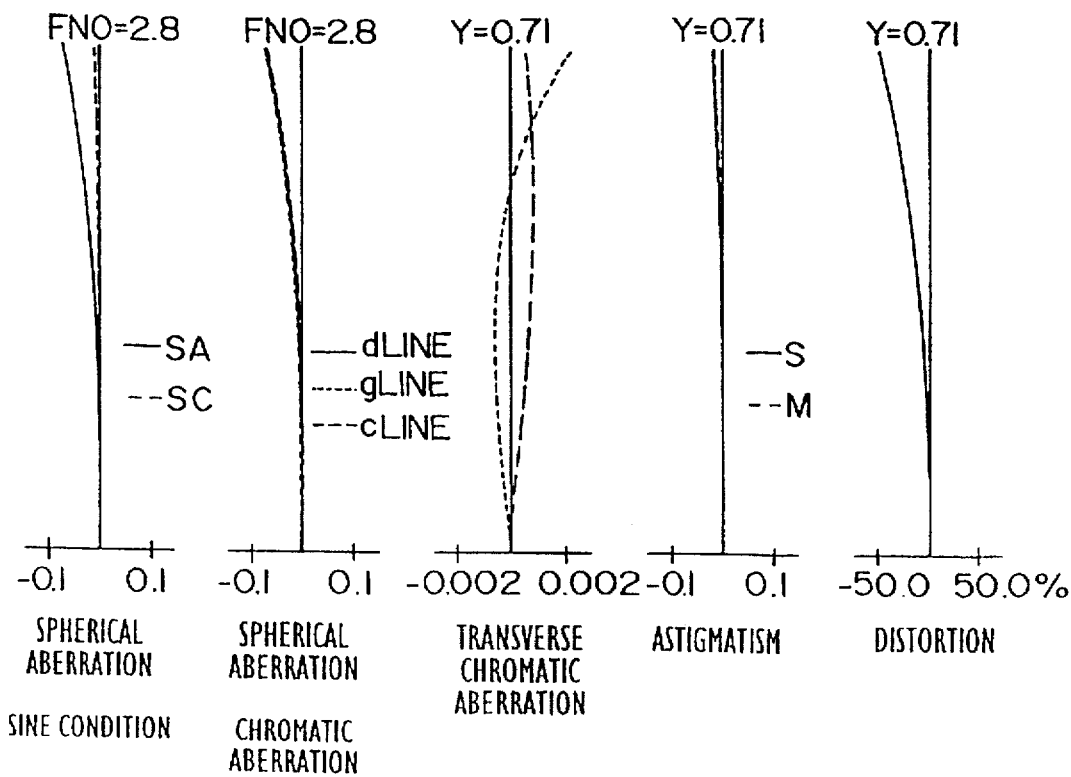
FIGS. 12A, 12B, 12C, 12D, and 12E show various aberration diagrams of the objective lens shown in FIG. 11.

Fifth Embodiment:

FIG. 11 shows a lens arrangement of an objective lens, according to a fifth embodiment of the present invention.

The second lens group is comprised of a single positive lens. The third lens group is comprised of a cemented lens consisting of a positive lens and a negative lens.

Numerical data of the lens system shown in FIG. 11 is shown in Table 5 below. Diagrams of various aberrations thereof are shown in FIGS. 12A, 12B, 12C, 12D, and 12E.

TABLE 5

$F_{NO} = 1:2.82$
$f = 0.82$
$M = -0.079$
$\omega = 60.2°$
$f_B = 0.93$

| surface $N_O$ | $r_i$ | $d_i$ | $N_d$ | $\nu_d$ |
|---|---|---|---|---|
| 1 | ∞ | 0.60 | 1.75500 | 52.3 |
| 2 | 0.680 | 0.07 | — | — |
| STOP | ∞ | 0.03 | — | — |
| 3 | −27.654 | 1.08 | 1.72916 | 54.7 |
| 4 | −0.765 | 0.03 | — | — |
| 5 | 2.028 | 0.83 | 1.72916 | 54.7 |
| 6 | −0.913 | 0.30 | 1.92286 | 21.3 |
| 7 | −4.060 | — | — | — |

In the fifth embodiment, the refractive indexes $N_g$, $N_F$, and $N_C$ of the first lens at the g-line, F-line and C-line are as follows:

$N_g$: 1.77296
$N_F$: 1.76506
$N_C$: 1.75063.

Figure 13:
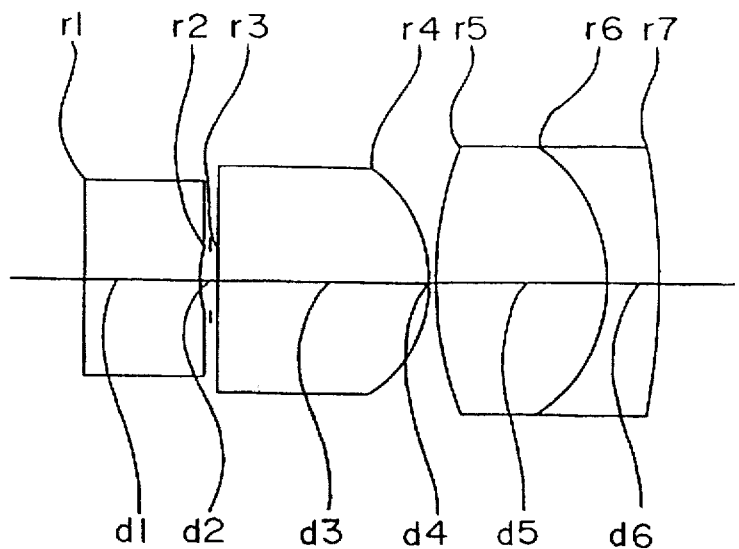
FIG. 13 is a schematic view of a lens arrangement of an objective lens for an endoscope, according to a sixth embodiment of the present invention.
Figures 14A, 14B, 14C, 14D, 14E:
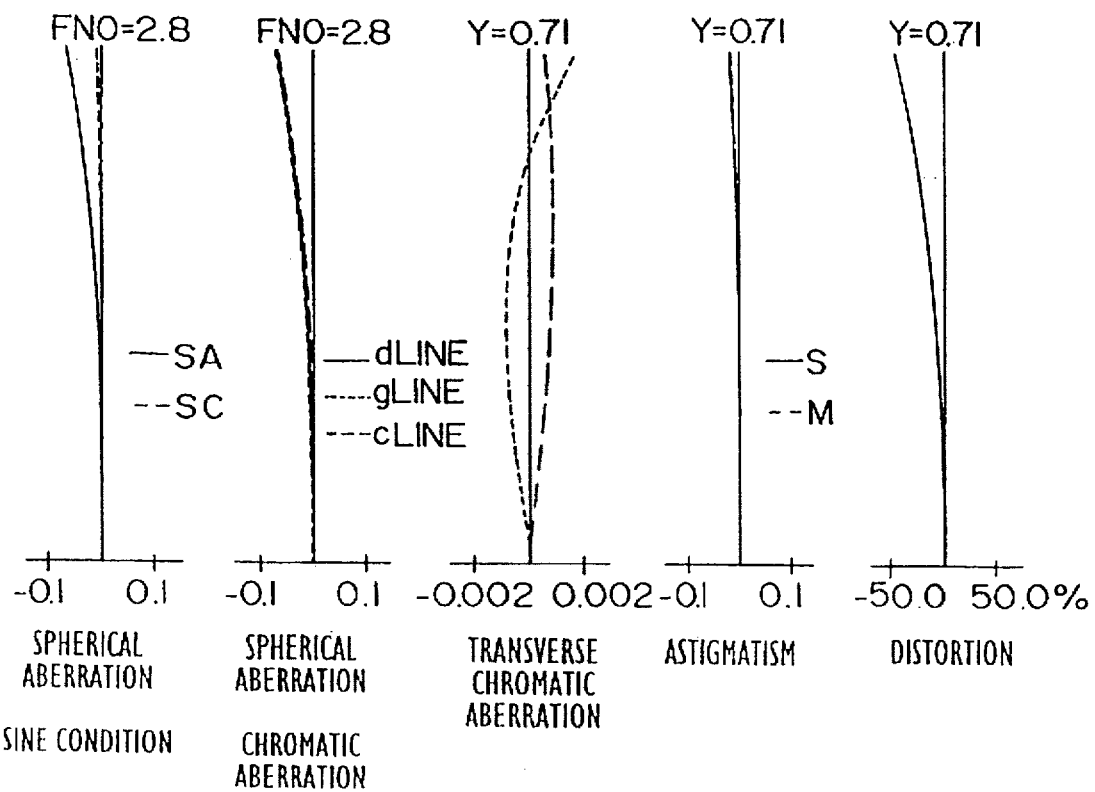
FIGS. 14A, 14B, 14C, 14D, and 14E show various aberration diagrams of the objective lens shown in FIG. 13.

Sixth Embodiment:

FIG. 13 shows a lens arrangement of an objective lens, according to a sixth embodiment of the present invention.

The second lens group is comprised of a single positive lens. The third lens group is comprised of a cemented lens consisting of a positive lens and a negative lens.

Numerical data of the lens system shown in FIG. 13 is shown in Table 6 below. Diagrams of various aberrations thereof are shown in FIGS. 14A, 14B, 14C, 14D, and 14E.

TABLE 6

$F_{NO} = 1:2.83$
$f = 0.82$
$M = -0.080$
$\omega = 60.0°$
$f_B = 0.93$

| surface $N_O$ | $r_i$ | $d_i$ | $N_d$ | $\nu_d$ |
|---|---|---|---|---|
| 1 | ∞ | 0.60 | 1.81600 | 46.6 |
| 2 | 0.680 | 0.06 | — | — |
| STOP | ∞ | 0.03 | — | — |
| 3 | −377.890 | 1.09 | 1.72916 | 54.7 |
| 4 | −0.775 | 0.03 | — | — |
| 5 | 2.035 | 0.92 | 1.72916 | 54.7 |
| 6 | −0.898 | 0.30 | 1.92286 | 21.3 |

In the sixth embodiment, the refractive indexes $N_g$, $N_F$, and $N_C$ of the first lens at the g-line, F-line and C-line are as follows:

$N_g$: 1.83800
$N_F$: 1.82825
$N_C$: 1.81075.

Figure 15:
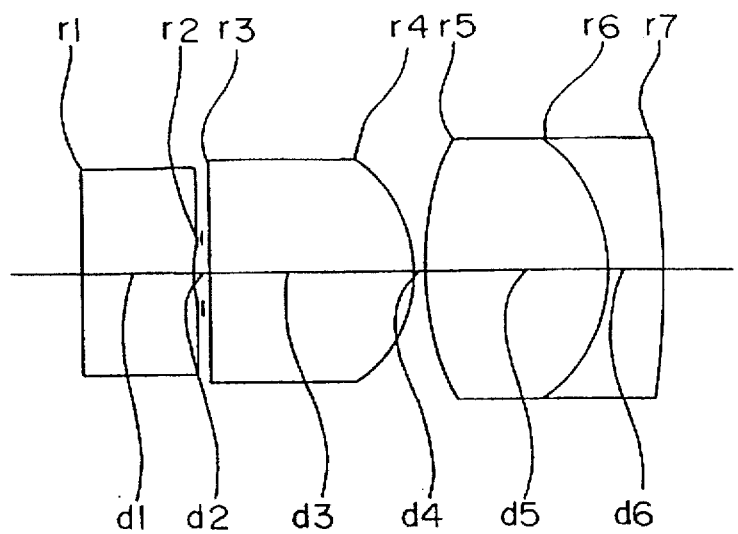
FIG. 15 is a schematic view of a lens arrangement of an objective lens for an endoscope, according to a seventh embodiment of the present invention.
Figures 16A, 16B, 16C, 16D, 16E:
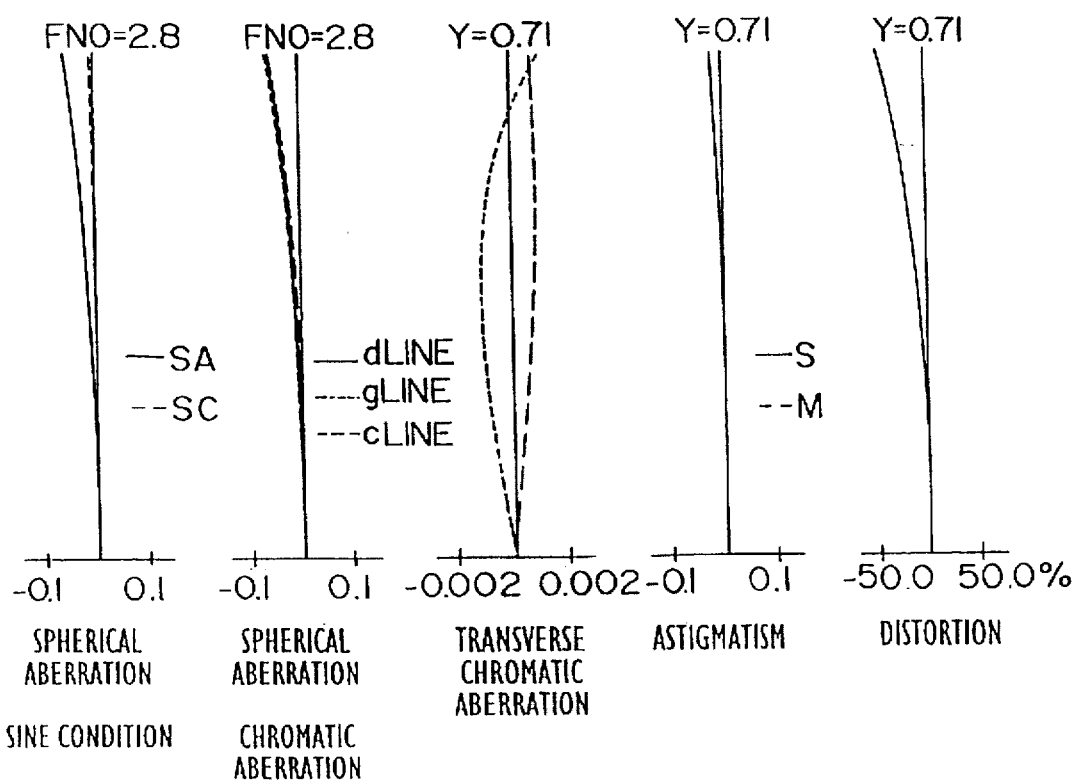
FIGS. 16A, 16B, 16C, 16D, and 16E show various aberration diagrams of the objective lens shown in FIG. 15.

Seventh Embodiment:

FIG. 15 shows a lens arrangement of an objective lens, according to a seventh embodiment of the present invention.

The second lens group is comprised of a single positive lens. The third lens group is comprised of a cemented lens consisting of a positive lens and a negative lens.

Numerical data of the lens system shown in FIG. 15 is shown in Table 7 below. Diagrams of various aberrations thereof are shown in FIGS. 16A, 16B, 16C, 16D, and 16E.

TABLE 7

$F_{NO} = 1:2.78$
$f = 0.82$
$M = -0.079$
$\omega = 60.2°$
$f_B = 0.72$

| surface $N_O$ | $r_i$ | $d_i$ | $N_d$ | $\nu_d$ |
|---|---|---|---|---|
| 1 | ∞ | 0.60 | 1.67650 | 37.5 |
| 2 | 0.608 | 0.05 | — | — |
| STOP | ∞ | 0.03 | — | — |
| 3 | 28.257 | 1.06 | 1.72916 | 54.7 |
| 4 | −0.759 | 0.07 | — | — |
| 5 | 1.767 | 0.97 | 1.72916 | 54.7 |
| 6 | −0.905 | 0.30 | 1.92286 | 21.3 |
| 7 | −6.200 | — | — | — |

In the seventh embodiment, the refractive indexes $N_g$, $N_F$, and $N_C$ of the first lens at the g-line, F-line and C-line are as follows:

$N_g$: 1.69958

$N_F$: 1.68919

$N_C$: 1.67117.

Eighth Embodiment:

FIG. 17 shows a lens arrangement of an objective lens, according to an eighth embodiment of the present invention.

The second lens group is comprised of a cemented lens consisting of a negative lens and a positive lens. The third lens group is comprised of a cemented lens consisting of a positive lens and a negative lens.

Numerical data of the lens system shown in FIG. 17 is shown in Table 8 below. Diagrams of various aberrations thereof are shown in FIGS. 18A, 18B, 18C, 18D, and 18E.

TABLE 8

$F_{NO} = 1:2.91$
$f = 0.82$
$M = -0.080$
$\omega = 60.2°$
$f_B = 0.87$

| surface $N_O$ | $r_i$ | $d_i$ | $N_d$ | $\nu_d$ |
|---|---|---|---|---|
| 1 | ∞ | 0.62 | 1.88300 | 40.8 |
| 2 | 0.781 | 0.07 | — | — |
| STOP | ∞ | 0.02 | — | — |
| 3 | −19.211 | 0.32 | 1.84666 | 23.8 |
| 4 | −331.844 | 0.70 | 1.69100 | 54.8 |
| 5 | −0.715 | 0.03 | — | — |
| 6 | 2.063 | 1.01 | 1.72916 | 54.7 |
| 7 | −0.904 | 0.20 | 1.92286 | 21.3 |
| 8 | −3.385 | — | — | — |

In the eighth embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656.

Figure 19:
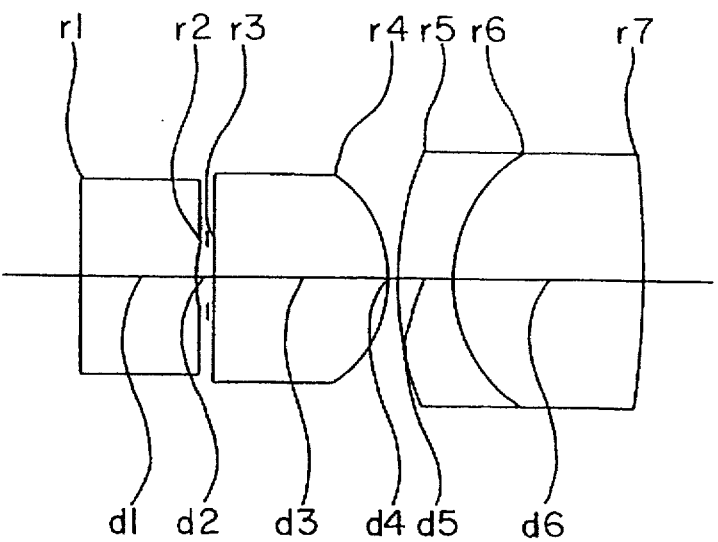
FIG. 19 is a schematic view of a lens arrangement of an objective lens for an endoscope, according to a ninth embodiment of the present invention; and, FIGS. 20A, 20B, 20C, 20D, and 20E show various aberration diagrams of the objective lens shown in FIG. 19.
Figures 20A, 20B, 20C, 20D, 20E:
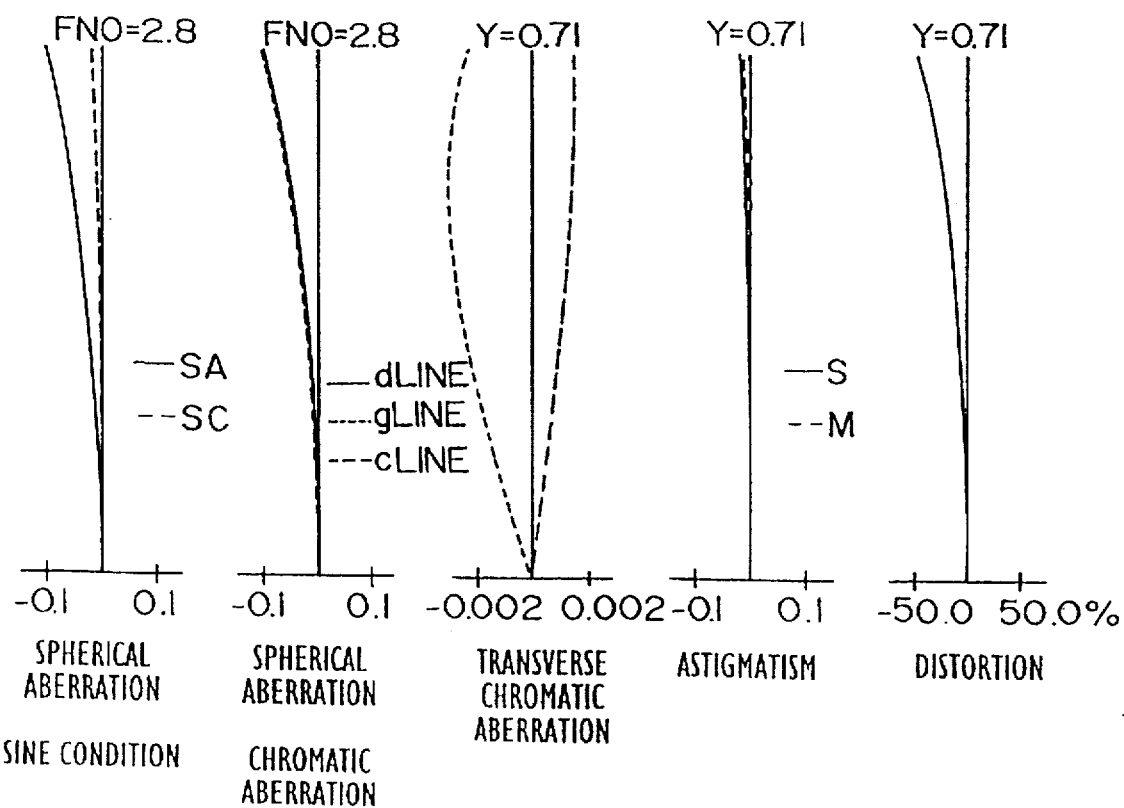

Ninth Embodiment:

FIG. 19 shows a lens arrangement of an objective lens, according to a ninth embodiment of the present invention.

The second lens group is comprised of a single positive lens. The third lens group is comprised of a cemented lens consisting of a positive lens and a negative lens.

Numerical data of the lens system shown in FIG. 19 is shown in Table 9 below. Diagrams of various aberrations thereof are shown in FIGS. 20A, 20B, 20C, 20D, and 20E.

TABLE 9

$F_{NO} = 1:2.83$
$f = 0.82$
$M = -0.080$
$\omega = 59.7°$
$f_B = 0.81$

| surface $N_O$ | $r_i$ | $d_i$ | $N_d$ | $\nu_d$ |
|---|---|---|---|---|
| 1 | ∞ | 0.60 | 1.88300 | 40.8 |
| 2 | 0.779 | 0.06 | — | — |
| STOP | ∞ | 0.03 | — | — |
| 3 | −4.835 | 0.90 | 1.69100 | 54.8 |
| 4 | −0.675 | 0.03 | — | — |
| 5 | 1.675 | 0.30 | 1.92286 | 21.3 |
| 6 | 0.801 | 0.95 | 1.72916 | 54.7 |
| 7 | −8.462 | — | — | — |

In the ninth embodiment, the refractive indexes $N_g$, $N_F$, and $N_C$ of the first lens at the g-line, F-line and C-line are as follows:

$N_g$: 1.91049

$N_F$: 1.89822

$N_C$: 1.87656.

The values of formulae (1) through (6) for each embodiment are shown in Table 10 below.

TABLE 10

| | formula(1) left side | formula(1) right side | formula (2) | formula (3) |
|---|---|---|---|---|
| Embodiment 1 | 1.2697 | 1.2743 | −1.072 | 40.8 |
| Embodiment 2 | 1.2697 | 1.2743 | −0.932 | 40.8 |
| Embodiment 3 | 1.2697 | 1.2743 | −1.019 | 40.8 |
| Embodiment 4 | 1.2697 | 1.2743 | −1.125 | 40.8 |
| Embodiment 5 | 1.2451 | 1.2487 | −1.100 | 52.3 |
| Embodiment 6 | 1.2572 | 1.2614 | −1.016 | 46.6 |
| Embodiment 7 | 1.2806 | 1.2816 | −1.102 | 37.5 |
| Embodiment 8 | 1.2697 | 1.2743 | −1.081 | 40.8 |
| Embodiment 9 | 1.2697 | 1.2743 | −1.078 | 40.8 |
| | formula(4) | formula(5) | formula(6) | |
| Embodiment 1 | 0.15036 | −0.943 | 0.100 | |
| Embodiment 2 | 0.15036 | −0.863 | 0.165 | |
| Embodiment 3 | 0.23186 | −0.895 | 0.114 | |
| Embodiment 4 | 0.15036 | −0.973 | 0.100 | |
| Embodiment 5 | 0.19370 | −0.934 | 0.116 | |
| Embodiment 6 | 0.19370 | −0.945 | 0.112 | |
| Embodiment 7 | 0.19370 | −0.930 | 0.101 | |
| Embodiment 8 | 0.19370 | −0.881 | 0.116 | |
| Embodiment 9 | 0.19370 | −0.824 | 0.107 | |

As can be seen from Table 10 above, all of the nine embodiments satisfy the requirements defined by formulae (1) through (6). Moreover, an objective lens for an endoscope according to the present invention has a small transverse chromatic aberration and can effectively correct other aberrations.

As may be understood from the above discussion, according to the present invention, in an objective lens including three lens groups, particularly, the transverse chromatic aberration can be effectively reduced. Moreover, an inexpensive objective lens for an endoscope can be obtained.

We claim:

1. An objective lens for an endoscope comprising a first lens group comprising one negative lens, a second lens group comprising at least one positive lens, and a third lens group comprising at least one positive lens, as viewed from an object side, wherein the objective lens satisfies the following relationship:

$$\theta_{g,F} < -2.223 \times 10^{-3} \nu_d + 1.365$$

wherein, $$\theta_{g,d} = (n_g - n_d)/(n_F - n_C);$$

$n_g$ designates a refractive index of a glass material of the first lens group at the g-line;

$n_d$ designates a refractive index of a glass material of the first lens group at the d-line;

$n_F$ designates a refractive index of a glass material of the first lens group at the F-line;

$n_C$ designates a refractive index of a glass material of the first lens group at the C-line; and $v_d$ designates an Abbe number of a glass material of the first lens group.

2. The objective lens for the endoscope according to claim 1, wherein said objective lens further satisfies the following relationship:

$$-1.2 < f_1/f < -0.8$$

wherein $f_1$ designates a focal length of the first lens; and $f$ designates a focal length of the whole objective lens.

3. The objective lens for the endoscope according to claim 1, wherein said second lens group further comprises a negative lens, and said negative lens is cemented to said positive lens of said second lens group.

4. The objective lens for the endoscope according to claim 3, wherein said negative lens cemented to said positive lens, and said positive lens of said third lens group are arranged in this order from an object side.

5. The objective lens for the endoscope according to claim 1, wherein said third lens group further comprises a negative lens, and said negative lens of said third lens group is cemented to said positive lens of said third lens group.

6. The objective lens for the endoscope according to claim 5, wherein said positive lens of said second lens group, and said negative lens cemented to said positive lens are arranged in this order from an object side.

7. The objective lens for the endoscope according to claim 5, wherein said negative lens cemented to said positive lens, and said positive lens of said third lens group are arranged in this order from an object side.

8. The objective lens according to claim 1, said third lens group comprising a negative lens cemented to said positive lens of said third lens group and wherein the following relationships are satisfied:

$$v_d < 55 \text{ and}$$

$$n_{n3} - n_{p3} > 0.12$$

wherein $n_{n3}$ designates a refractive index of said negative lens of said third lens group at the d-line; and $n_{p3}$ designates a refractive index of said positive lens in said third lens group at the d-line.

9. The objective lens according to claim 1, wherein the following relationships are satisfied:

$$-1.2 < R_A/f < -0.6 \text{ and}$$

$$0.05 < d_2/f < 0.3$$

wherein $R_A$ designates a radius of curvature of the surface of said second lens group that is located closest to an object image; and $d_2$ designates a distance between said first lens group and said second lens group.

10. The objective lens according to claim 9, wherein the following relationship is satisfied:

$$-1.0 < R_A/f < -0.8.$$

* * * * *